United States Patent [19]
Rein

[11] Patent Number: 4,816,076
[45] Date of Patent: Mar. 28, 1989

[54] CONTINUOUS PAN CRYSTALLIZER

[75] Inventor: Peter W. Rein, Natal, South Africa

[73] Assignee: The Tongaat-Gulett Group Limited, Tongaat, South Africa

[21] Appl. No.: 5,288

[22] Filed: Jan. 16, 1987

Related U.S. Application Data

[63] Continuation of Ser. No. 646,692, Aug. 31, 1984, abandoned.

[51] Int. Cl.[4] .......................... C13F 1/00; B01D 9/02

[52] U.S. Cl. .......................................... 127/16; 127/18; 127/61; 159/27.1; 422/245

[58] Field of Search .................... 422/245; 127/15, 16, 127/18, 58, 59, 60, 61, 62; 159/27.1-27.5

[56] References Cited

U.S. PATENT DOCUMENTS 2,587,293 2/1952 de Vries .............................. 127/15
3,627,582 12/1971 Dambrine et al. ................ 127/15 X
3,879,215 4/1975 DeVillers et al. ................ 127/15 X
4,009,045 2/1977 Petri ..................................... 127/16

FOREIGN PATENT DOCUMENTS 1141639 1/1969 Australia .
37347 1/1980 Australia .
2329317 5/1977 France .
378341 8/1932 United Kingdom .

*Primary Examiner*—W. Gary Jones
*Attorney, Agent, or Firm*—Young & Thompson

[57] ABSTRACT

A continuous pan crystallizer, which is conventional in that it has a number of compartments, has cross-over ports through which massecuite passes from compartment to compartment just above heating tubes in the compartments. The cross-over ports have baffles on both sides to avoid short-circuiting or bypass of massecuite from one compartment to another.

4 Claims, 1 Drawing Sheet

CONTINUOUS PAN CRYSTALLIZER

This is a continuation of application Ser. No. 646,692, filed on Aug. 31, 1984, now abandoned.

FIELD OF THE INVENTION

This invention relates to continuous vacuum pan crystallizers.

BACKGROUND OF THE INVENTION

Most continuous pan crystallizers are divided into a number of compartments in an attempt to promote plug-rate flow through the system. It is important that the system flow approach the plug rate of flow as closely as possible, so that crystal residence times in the continuous pan are uniform, leading to equal growth on all crystals and a uniform crystal size in the product massecuite leaving the pan.

One of the objects of the present invention is to provide a system for massecuite to pass from one compartment to another in such a way as to eliminate problems experienced with other types of continuous pans, such as:

(a) short-circuiting or by-passing of massecuite from one compartment to another.

(b) elimination of encrustation in the opening between compartments.

In order to overcome the latter problem, steam blowers needed to be installed in some pans at the cross-over ports, to prevent encrustation in the ports. This is expensive and detrimental to thermal economy.

Another object of the invention is to eliminate encrustation of sugar on baffles and other surfaces inside the pan. Such encrustation can lead to the formation of lumps or the dislodging of large pieces of encrustation which can block heating tubes or massecuite outlets.

A further object is to provide a condenser integral with the pan to reduce the cost of the continuous vacuum pan system.

THE INVENTION

According to the invention a continuous pan crystalliser includes a plurality of compartments, baffles being provided on either or both sides of the cross-over ports and arranged for the massecuite moving in the direction of the cross-over ports to pass up through the tubes between the baffles and the walls of the compartments.

The massecuite must, therefore, have had at least one pass through the tubes before leaving a compartment. Massecuite which passes through the cross-over port is directed into the downtake area of the next compartment.

The cross-over ports are preferably located immediately above the calandria, (i.e., heating tubes) and the turbulence and vigorous flow obtained in these zones keeps the cross-over ports free of encrustation.

A further aspect of the invention is the provision of very fine water sprays onto all surfaces extending above the normal massecuite operating level. This eliminates any build-up or encrustation on these surfaces, which can otherwise lead to the formation of lumps. Because the quantity of water sprayed through the sprays is very small, it does not affect the control of the supersaturation of the mother liquor in the massecuite and the crystallisation process in not affected.

In a further aspect of the invention, the continuous pan is provided with an integral condenser. This has the advantage of eliminating the costly steelwork and large diameter vapour piping required for conventional separate condensers.

BRIEF DESCRIPTION OF THE DRAWING

An embodiment of the invention is described below with reference to the accompanying drawings, in which.

DESCRIPTION OF AN EMBODIMENT OF THE INVENTION

Figure 4:
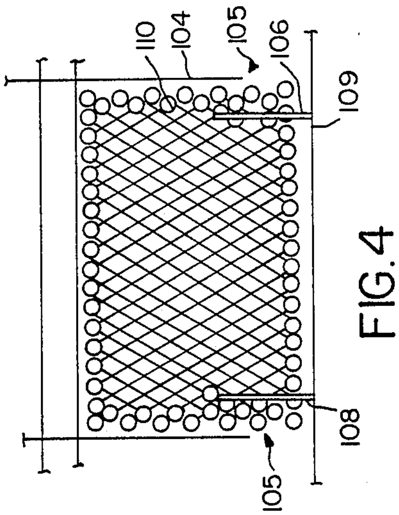
FIG. 4 is a more detailed, schematic plan of heating tubes in one compartment of the crystallizer.
Figure 3:
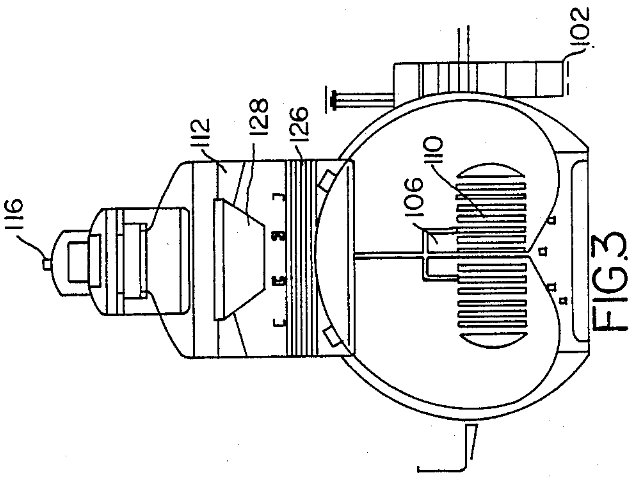
FIG. 3 is a schematic end view of the crystallizer.
Figure 1:
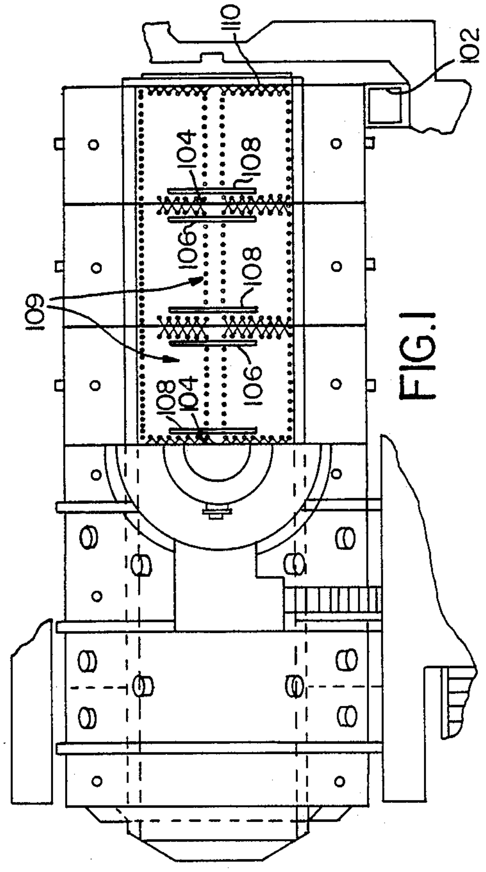
FIG. 1 is a schematic plan view, partly in section, of a continuous pan crystalliser according to the invention.
Figure 2:
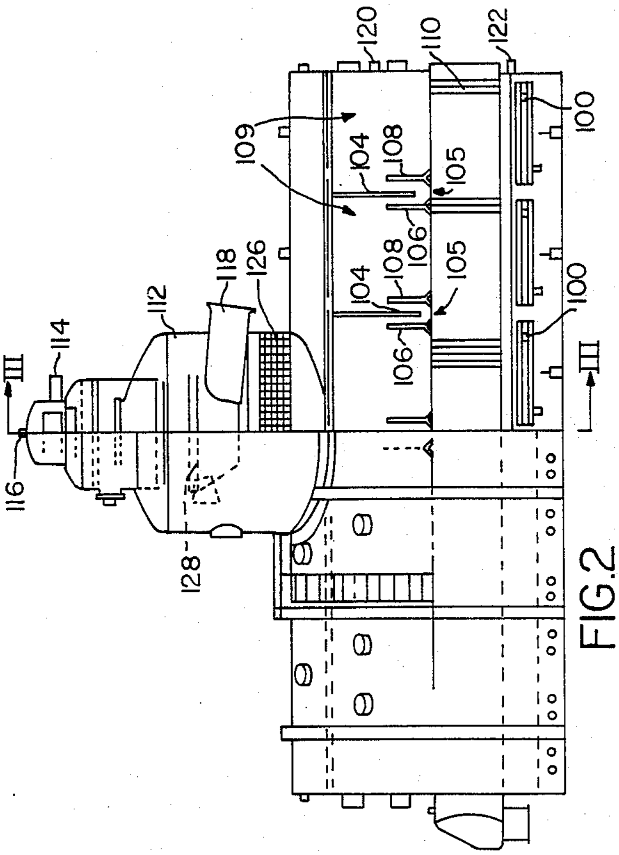
FIG. 2 is a schematic side view, partly cut away, of the same crystallizer.

In the drawings a continuous pan crystallizer includes a plurality of compartments at 109 (in this case 12) as shown. Seed massecuite enters the first compartment and syrup or malosses enters the crystallizer through ports 100. The massecuite passes counterclockwise from one compartment to the next around the apparatus and leaves it through the outlet 102 (see FIG. 3). The cross-over ports at 105 through partitions 104 between each two adjacent compartments at 109 each have a pair of baffles 106, 108 which are located a short longitudinal distance from opposite sides the ports, which are at and above the level of the tops of heating tubes 110, which are disposed vertically in the lower portions of the compartments. One vertical edge of the baffles abuts the wall of a compartments and the other is located a short transverse distance away from a vertical edge (not shown) of the ports. Thus, the massecuite flows up the tubes of one compartment to the baffle 108 thereof, and then through the port 105 thereat. It then passes through the port and then has to negotiate the second baffle 106 on the downstream side of the compartment 109, which directs the massecuite into the downtake.

It will be appreciated that the dimensions and location of the baffles will differ according to the various parameters of the crystallizer and will have to be determined with a view to obtaining optimum plug flow and direction according to pan capacity and evaporation rate.

The second aspect of the invention involves the installation of fine water sprays, positioned above the normal massecuite level. These sprays are so positioned as to direct a fine spray of water onto some or all of the surfaces of the compartment 109, the deflection baffles 106 and 108, and the internal surfaces of the shell of the vessel.

The third aspect of the invention is the provision of an integral condenser generally indicated by reference 112.

The condenser is attached to the top wall of the crystallizer and thereby obviates the expense of the complicated support means which would otherwise be necessary. The condenser has an injection water inlet 114 and a vacuum connection 116 and an injection water outlet 118.

The condenser is conventional, preceded by an entrainment separator 126. The rising vapour is contacted in the condenser with a downwardly directed spray of cooling water for collection in a collector 128 for removal through outlet 118.

I claim:

1. A continuous-pan crystallizer, comprising
- a plurality of compartments within the pan of said crystallizer for receiving massecuite through which said massecuite flows along a path;
- partition means between adjacent compartments along the flow path of said massecuite, said partition means defining an underflow opening between said adjacent compartments;
- opposing overflow weirs on opposite sides of said underflow opening defined by said partition means, said partition means and said overflow weirs defining a flow path between said adjacent compartments; and
- a plurality of heating tubes disposed within a lower portion of said compartments, said heating tubes being in fluid communication with said compartments and terminating within said compartments at a level coextensive with the lower extremity of said underflow openings, and means for providing turbulence and vigorous flow of the massecuite through said tubes maintaining said underflow opening free of encrustation.

2. The continuous pan crystallizer of claim 1 wherein at least a portion of said heating tubes terminate between opposing overflow weirs and within said flow path between said adjacent compartments.

3. The continuous-pan crystallizer of claim 1 further including condenser means positioned above and forming a portion of the upper extent of said crystallizer so as to be in direct communication with each of said compartments.

4. The continuous-pan crystallizer of claim 1 wherein said heating tubes are vertically disposed within a lower portion of said compartments.

* * * * *